US008640218B2

(12) United States Patent
Bartholomy et al.

(10) Patent No.: US 8,640,218 B2
(45) Date of Patent: Jan. 28, 2014

(54) SYSTEM, METHOD AND PROGRAM FOR MANAGING FIREWALLS

(75) Inventors: Erik Bartholomy, Longmont, CO (US); Robert M. Castner, Cortland Manor, NY (US); Nicolas Edward Fosdick, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/545,957

(22) Filed: Jul. 10, 2012

(65) Prior Publication Data

US 2012/0284770 A1 Nov. 8, 2012

Related U.S. Application Data

(63) Continuation of application No. 12/903,829, filed on Oct. 13, 2010, now Pat. No. 8,250,642, which is a continuation of application No. 11/611,298, filed on Dec. 15, 2006, now abandoned.

(51) Int. Cl.
*G06F 21/00* (2013.01)

(52) U.S. Cl.
USPC .......................................................... 726/11

(58) Field of Classification Search
USPC .......................................................... 726/11
See application file for complete search history.

(56) References Cited

U.S. PATENT DOCUMENTS

| 6,606,710 | B2 | 8/2003 | Krishnan et al. |
| 6,772,347 | B1 | 8/2004 | Xie et al. |
| 6,947,983 | B2 | 9/2005 | Corl, Jr. et al. |
| 2004/0054927 | A1 | 3/2004 | Leppanen et al. |
| 2005/0055573 | A1 | 3/2005 | Smith |
| 2006/0010491 | A1 | 1/2006 | Prigent et al. |
| 2006/0041936 | A1 | 2/2006 | Anderson et al. |
| 2008/0148382 | A1 | 6/2008 | Bartholomy et al. |
| 2011/0030048 | A1 | 2/2011 | Bartholomy et al. |

OTHER PUBLICATIONS

IBM Perimeter Assessment Tool, commerically used in Nov. 2003.
Hamed, H. et al., "Dynamic Rule Ordering Optimization for High Speed Firewall Filtering" Mar. 2006, Proceedings of the 2006 ACM Symposium on Information,Computer and Communications Security ASIACCS 2006, pp. 332-342.
Windows XP Service Pack 2 Firewall, Jan. 2006, www.stanford.edu/services/ess/pc/xpsp2/firewall.html, pp. 1-8.
Non-Final Office Action dated Mar. 10, 2010 for U.S. Appl. No. 11/611,298.
Final Office Action dated Feb. 10, 2011 for U.S. Appl. No. 11/611,298.
Non-Final Office Action dated Dec. 7, 2011 for U.S. Appl. No. 12/903,829.
Notice of Allowance dated Apr. 13, 2012 for U.S. Appl. No. 12/903,829.

*Primary Examiner* — Lisa Lewis

(74) *Attorney, Agent, or Firm* — Arthur J. Samodovitz

(57) ABSTRACT

Computer system, method and program for managing a firewall. First program instructions identify a first rule of the firewall. The first rule specifies a permitted message flow through the firewall to or from an IP address of a computer. The computer resides on a network. Second program instructions identify a second rule of the firewall. The second rule specifies a permitted message flow through the firewall to or from an IP address corresponding to the network. Message flows through the firewall to all computers on the network are permitted pursuant to the second rule. Third program instructions delete the first rule from the firewall based on the identification of the second rule and the computer residing on the network. Other program instructions identify and delete stale rules which are not needed. Other program instructions automatically identify rules for a new server added to a cluster.

6 Claims, 6 Drawing Sheets

SYSTEM, METHOD AND PROGRAM FOR MANAGING FIREWALLS

CROSS REFERENCE TO RELATED APPLICATION

This application is a Continuation of application Ser. No. 12/903,3829 filed Oct. 13, 2010 and now U.S. Pat. No. 8,250,642, which is a Continuation of abandoned U.S. patent application Ser. No. 11/611,298 filed Dec. 15, 2006.

FIELD OF THE INVENTION

The invention relates generally to computer systems and networks, and more specifically to management of firewall rules.

BACKGROUND OF THE INVENTION

Networks, such as Intranets, subnets, Internets and WANs are well known today, along with firewalls to control access to local networks, and computers and other devices on local networks. A firewall is a program or device, at a gateway to the local network or within computers on the local network. The firewall may control access to the local network or computer based on a list of "rules" of permitted incoming or outgoing message flows through the firewall. The permitted message flows may be defined by a list of IP addresses of specific computers or networks from which or to which messages are permitted to flow through the firewall, and optionally, respective permitted ports and protocols for such IP addresses for both incoming messages and outgoing messages. If a firewall rule identifies a network (such as a subnet) as a permitted source network or permitted destination network, then all computers on the network are permitted source devices or permitted destination devices, respectively. As known in the industry, an IP address comprises four sets of numbers, with each set separated from the adjacent set by a period. The first three sets of numbers identify a local network. The fourth set of numbers identifies a specific device on the local network. To identify a subnet (including all devices on the subnet), the fourth set of numbers is a "zero". So, if all computers on a specific subnet are permitted to receive incoming messages or send outgoing messages, the firewall rule would include three sets of numbers for the beginning of the IP address to identify the subnet, and a last set of numbers equal to "zero".

Over time, systems administrators tend to add to the firewall, additional rules of permitted message flows, so the list of rules generally grows with time. The firewall needs to check every incoming and outgoing message against the rules in the firewall, so a lengthy list of rules will generally slow the flow of messages. Some of the rules may not be needed or may be improper, and they needlessly slow the flow of messages.

Also, occasionally, a server needs to be added to a cluster of existing servers to improve performance of a common application hosted by the cluster of servers. Upon addition of the server to the cluster, rules need to be added to the firewall to allow message flows to the new server in the cluster. It has proven tedious in the past for an administrator to determine and enter these rules for the new server. If a server was added to a cluster or grouping of computers, the firewall administrator will typically use for the added server all the rules from an existing server that belongs to the same cluster. However, a new or existing server may exist within many clusters; therefore the rules used for the new server may include the rules for the servers in all the other clusters to which the new or existing servers belong. This may result in unnecessary or redundant rules that burden the firewall.

An object of the present invention is to identify and delete unneeded rules in a firewall.

Another object of the present invention is to identify and delete improper rules in a firewall.

Another object of the present invention is to automate and improve the process of determining new rules to add to a firewall when a new server is added to a cluster of servers.

SUMMARY OF THE INVENTION

The present invention resides in a computer system, method and program for managing a firewall. First program instructions identify a first rule of the firewall. The first rule specifies a permitted message flow through the firewall to or from an IP address of a computer. The computer resides on a network. Second program instructions identify a second rule of the firewall. The second rule specifies a permitted message flow through the firewall to or from an IP address corresponding to the network. Message flows through the firewall to all computers on the network are permitted pursuant to the second rule. Third program instructions delete the first rule from the firewall based on the identification of the second rule and the computer residing on the network.

The present invention also resides in another computer system, method and program for managing a firewall for a first server added to a cluster of a plurality of other servers. The firewall comprises a multiplicity of rules of permitted message flows through the firewall. First program instructions identify a first plurality of the rules of permitted message flows through the firewall to or from the plurality of servers, respectively. The first plurality of rules are substantially the same as each other except for specification of different respective ones of the plurality of servers as a source or destination of the messages. Second program instructions respond to the identification of the first plurality of rules by the first program instructions by automatically generating a new rule for the firewall. The new rule is substantially the same as the first plurality of rules except the new rule specifies the first server instead of the other servers in the cluster. The multiplicity of rules in the firewall include a rule for a permitted message flow to or from an application in one of the other servers. The other servers in the cluster do not include a copy of the application, and there is no corresponding rule for the application in the firewall for the other servers in the cluster.

The present invention also resides in another computer system, method and program for managing a firewall. The firewall comprises a multiplicity of rules of permitted message flows through the firewall. First program instructions identify one or more of the rules that have not been used in a predetermined time to authorize an actual, respective message flow through the firewall. Second program instructions determine if the one or more rules are listed as needed even though they have not been used in the predetermined time to authorize an actual, respective message flow through the firewall. Third program instructions notify an administrator of any of the one or more rules that have not been used in the predetermined time to authorize an actual, respective message flow through the firewall and are not listed as needed.

DETAILED DESCRIPTION OF THE PREFERRED EMBODIMENTS

Figure 1:
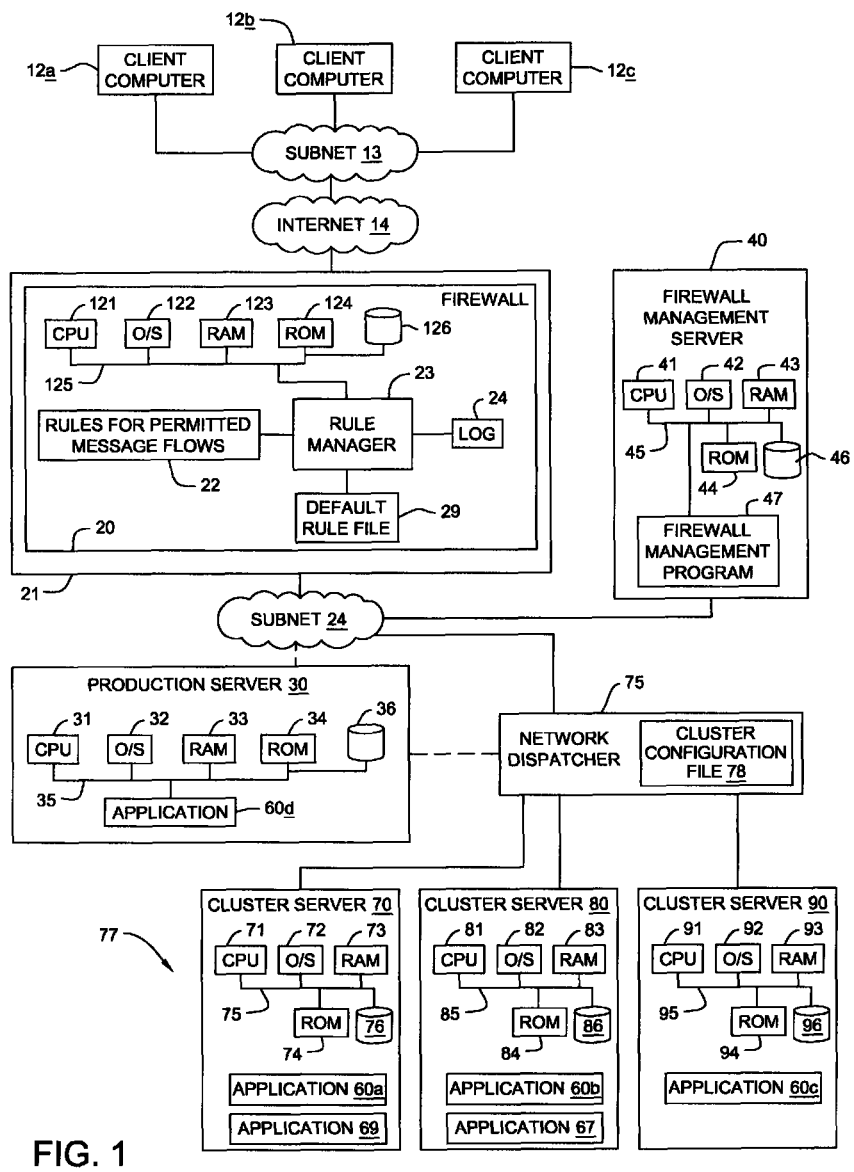
FIG. 1 is a block diagram of a distributed computer system including a firewall and a firewall management server and program according to the present invention.

The present invention will now be described in detail with reference to the figures. FIG. 1 illustrates a distributed computer system generally designated 10. Distributed system 10 comprises multiple client computers 12a, b . . . n on a subnet 13 which is connect to network 14, such as the Internet. Distributed system also includes a local network 24 (such as a subnet), and multiple production servers 30, 70, 80 and 90 on the local network 24. Server 30 includes a CPU 31, operating system 32, RAM 33, and ROM 34 on a common bus 35, and storage 36 and application 60d. Server 70 includes a CPU 71, operating system 72, RAM 73, and ROM 74 on a common bus 75, and storage 76 and application 60a. Server 80 includes a CPU 81, operating system 82, RAM 83, and ROM 84 on a common bus 85, and storage 86 and application 60b. Server 90 includes a CPU 91, operating system 92, RAM 93, and ROM 94 on a common bus 95, and storage 96 and application 60c. Applications 60a-d are all copies of a same application. Servers 70, 80 and 90 are in a cluster 77, with a common dispatcher 75 to dispatch work requests to the servers in the cluster based on a known load balancing algorithm.

Distributed system 10 also includes a firewall 20 with a list 22 of rules of permitted incoming and outgoing messages flows to and from servers 30, 70, 80 and 90. Firewall 20 includes a rule manager 23, implemented in software and/or hardware, to manage updates to the list 22 of rules and log when an incoming or outgoing message matches a rule in the list. Firewall 20 can reside in a gateway device 21 as shown, such as a gateway server 21 connected to Internet 14. Gateway server 21 includes a CPU 121, operating system 121, RAM 123 and ROM 124 on a common bus 125 and storage 126. In the illustrated embodiment, firewall 20 logically resides at the gateway to local network 24 to which production servers 30, 70, 80 and 90 and a firewall management server 40 are connected.

Firewall management server 40 includes a CPU 41, operating system 42, RAM 43, and ROM 44 on a common bus 45, and storage 46. (Alternately, there can be a separate firewall in each production server.)

The permitted message flows listed in firewall 20 may be defined by IP addresses for local networks or specific computers, and ports/protocols for permitted incoming or outgoing messages. If a firewall rule identifies a subnet as a permitted source network or permitted destination network, then all computers on the subnet are permitted source devices or permitted destination devices, respectively. An IP address comprises four sets of numbers, with each set separated from the adjacent set by a period. The first three sets of numbers identify a local network and the fourth set of numbers identifies a specific computer (or other device) on the local network. To identify a subnet (including all devices on the subnet), the fourth set of numbers is a "zero". So, if all computers on a specific subnet are permitted to receive incoming messages or send outgoing messages, the firewall rule would include three sets of numbers for the beginning of the IP address to identify the subnet, and a last set of numbers equal to "zero". Firewall 20 compares each incoming and outgoing message to the rules in list 22 to determine if the incoming or outgoing messages matches any of the rules. If so, the message is permitted to pass through the firewall. If not, the message is not permitted to pass through the firewall.

Firewall management server 40 includes a firewall management program 47 stored on computer readable storage media 46 for execution by CPU 41 via computer readable RAM 43, which periodically reads the list 22 of rules of permitted data flows through firewall 20, and identifies and initiates deletion of redundant rules. A "redundant" rule is a rule that is either an exact copy of another rule or is encompassed by another rule. An example of the latter situation is as follows. There is a rule in firewall 20 that permits communication from a specified computer, such as computer 12a on subnet 13, to production server 30, behind the firewall 20. There is another rule in firewall 20 which permits communication from any and all computers on subnet 13 to server 30. This other rule which permits communication from any and all computers on subnet 13 to server 30 encompasses the rule which permits communication from computer 12a on subnet 13 to server 30. Therefore, the rule which permits communication from computer 12a on subnet 13 to server 30 is "redundant" of the other rule which permits communication from any and all computers on subnet 13 to server 30, and is not needed. In this example, firewall management program 47 will identify and initiate deletion of the rule which permits communication from computer 12a to server 30. Program 47 will identify the redundant rule because the first three sets of numbers of its IP address will match the first three sets of numbers of the IP address of subnet 13 of the encompassing rule, the last set of numbers of the redundant rule will not be zero, and the last set of numbers of the encompassing rule will be zero (which indicates that all devices on subnet 13 can send incoming messages to server 30). Another example of a redundant rule is as follows. An administrator defines a group of servers by a group name, and then adds a rule to firewall 20 which states that incoming messages are permitted from this named group of servers. There is another rule in firewall 20 which states that incoming messages from a named one of the servers in the group is permitted. This other rule is "redundant" and not needed, because it is encompassed by the group rule. Firewall management program 47 identifies this other rule by comparing each rule in the list 22 for a named computer, to the definition of each group of a group rule to determine if the computer named in each rule for a named computer is included in one of the groups and if there is another rule which permits communications with the entire group.

Figure 2A:
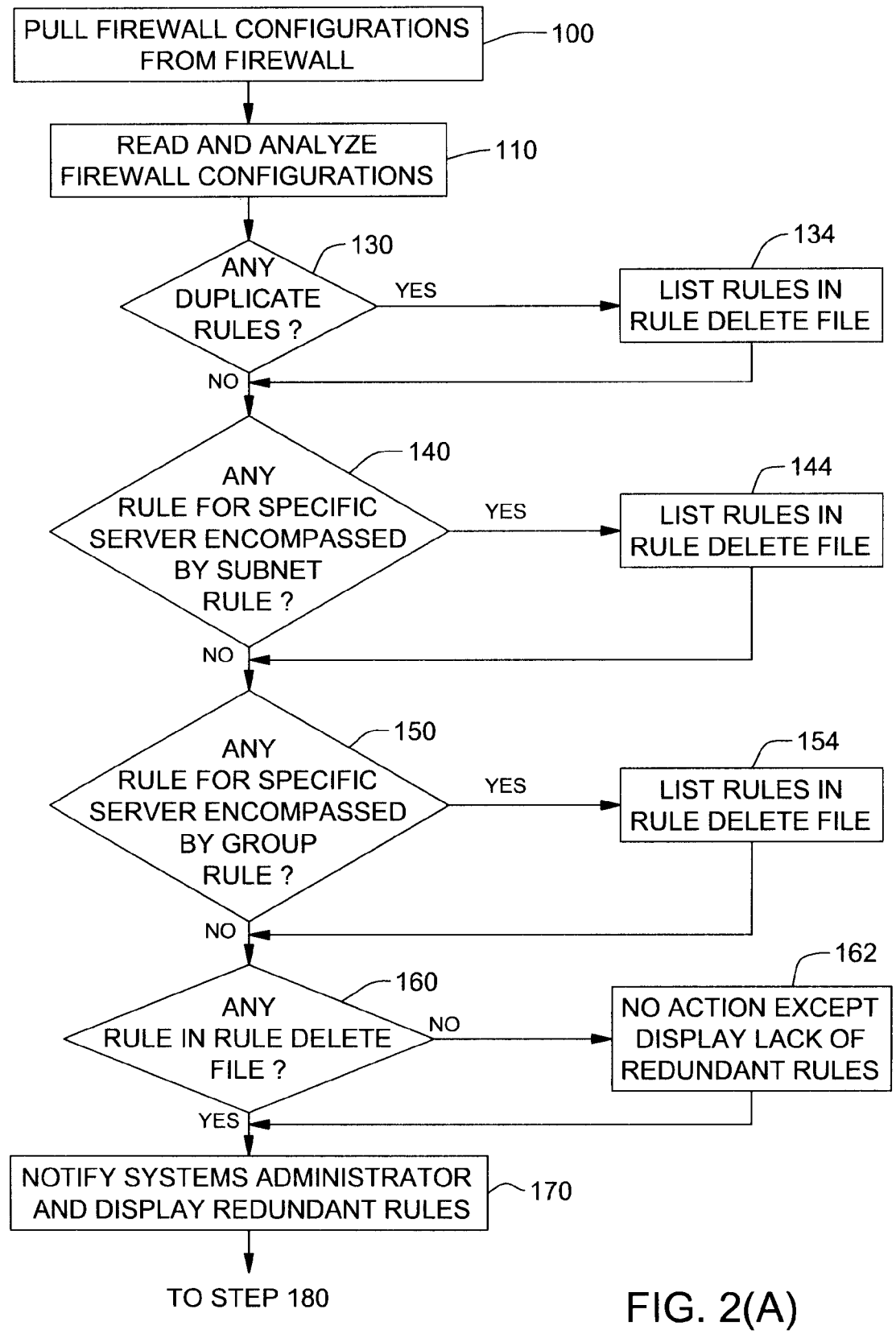
FIGS. 2(A) and 2(B) form a flow chart of a function of the firewall management program of FIG. 1, which identifies redundant rules for deletion.
Figure 2B:
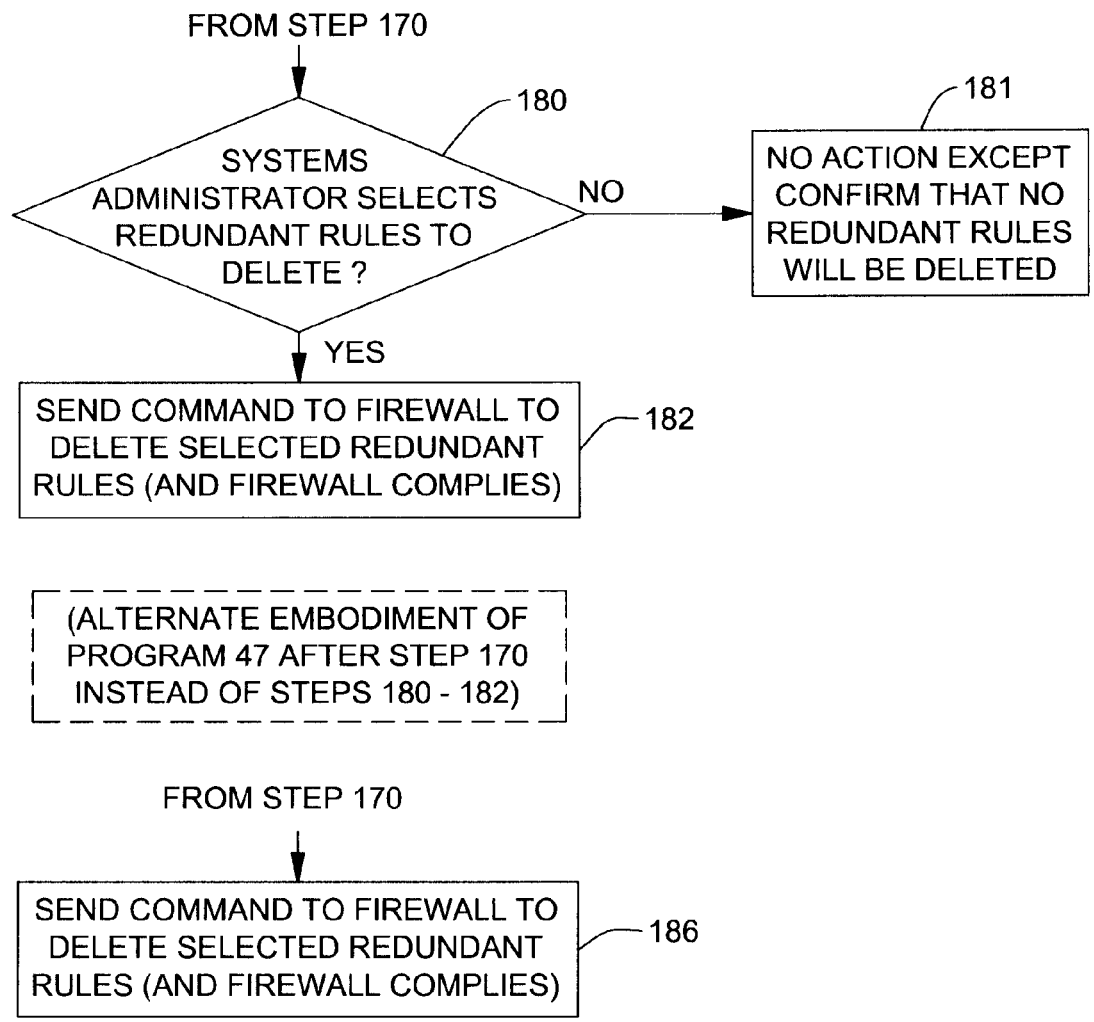

FIGS. 2(A) and 2(B) form a flow chart illustrating the foregoing function of firewall management program 47 in more detail. In step 100, program 47 queries firewall 20 and receives the list 22 of rules of permitted message flows. Next, program 47 reads the rules in the list 22 and analyzes them to sort, identify and categorize (step 110). Next, program 47 determines if there are any duplicate rules (decision 130). A "duplicate" rule is essentially identical to another rule, and names the same IP address (or the same group name), port/protocol, and direction of message flow. If there are any duplicate rules (decision 130, yes branch), then program 47 lists one rule in each pair of duplicate rules in a "rule delete file" 23 (step 134). If there are no duplicate rules (decision 130, no branch) or after step 134, then program 47 determines if there are any "encompassed" rules identifying a specific computer (by IP address) and port/protocol that are encompassed by a rule identifying a subnet containing the specified computer and identifying the same port/protocol (decision 140). If so (decision 140, yes branch), then program 47 lists the encompassed rule identifying the specific IP in the rule delete file 23 (step 144). If there are no rules identifying a specific IP which are encompassed by a subnet rule (decision 140, no branch) or after step 144, then program 47 determines if there are any rules identifying a specific computer that are encompassed by a rule identifying a named group/cluster encompassing the specified computer (decision 150). If so (decision 150, yes branch), then program 47 lists the rule identifying the specific IP from the group/cluster in the rule delete file 23 (step 154). If there are no encompassed rules identified in decision 150 (decision 150, no branch) or after step 154, then program 47 determines if there are any rules in the rule delete file 23 (decision 160). If not (decision 160, no branch), then program 47 displays the fact that there are no redundant rules (step 162). If so (decision 160, yes branch), then program 47 notifies a systems administrator of the redundant rules listed in file 23 and displays the redundant rules (step 170). In response, the systems administrator can select any or all of the redundant rules to be deleted (decision 180). If the systems administrator does not select any of the redundant rules for deletion, then program 47 confirms that no redundant rules will be deleted (step 181). However, if the systems administrator selects for deletion any or all of the redundant rules that are displayed (decision 180, yes branch), then program 47 will send a command to firewall 20 to delete the selected redundant rule (step 182), and firewall 20 will do so. Alternately, for each and every redundant (duplicate or encompassed) rule listed in file 23, after step 170, program 47 will automatically send a command to firewall 20 to delete the redundant rule (step 186) without prior selection/confirmation by a systems administrator (and firewall 20 will comply with the request to delete the redundant rule).

Firewall management program 47 also identifies rules in list 22 that have not been used in a predetermined time, for example three months, and are the type that would have been used in the predetermined time if needed. A firewall rule is "used" if it has been matched with an incoming or outgoing message to permit the message flow. Each time a firewall rule matches an incoming or outgoing message, firewall 20 logs this match in log 24. The log identifies the firewall rule which has been used, the time/date of the last use and the number of hit counts. However, some firewall rules, by their nature, are not used often. For example, some firewall rules permit messages to or from certain ports of disaster recovery servers, and such messages will only be sent or received during a disaster. Even though a disaster has not occurred within the predetermined period, this firewall rule is still needed and should not be deleted. For such rules, there is an indication in the list 22 of rules that the rule is needed or "persistent", even though it has not been "used" within the foregoing predetermined time.

Figure 3:
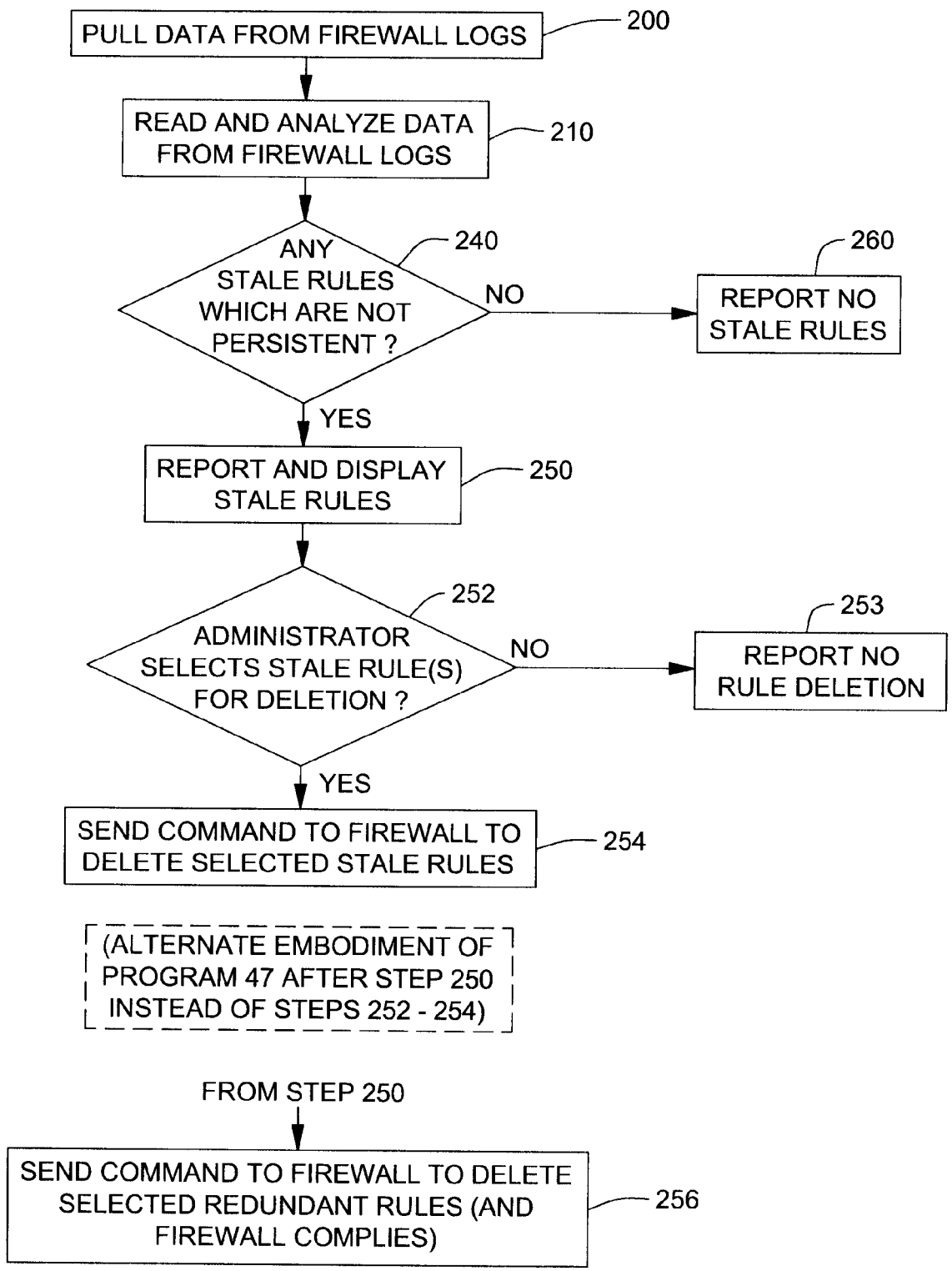
FIG. 3 is a flow chart of another function of the firewall management program of FIG. 1, which identifies unneeded stale rules for deletion.

FIG. 3 illustrates the foregoing function of firewall management program 47 in more detail. In step 200, program 47 queries firewall 20 for the content of the log 24. After firewall 20 returns the contents of the log to server 40, program 47 reads the contents and analyzes them to sort, identify and categorize them (step 210). Program 47 previously obtained from firewall 20 the list 22 of rules in step 120. Next, program 47 compares the rules in list 22 to the log contents to determine which of the rules have a log entry that is older than the predetermined time and the rule is not marked as "persistent" in list 22 (decision 240). Such rules are also considered "stale" in step 230. If there are no stale rules (decision 240, no branch), then program 47 generates, displays and sends a report of no stale rules (step 260). However, for any stale rules, program 47 records them in a "stale rules" file, displays them for an operator and also notifies an operator of the stale rules (step 250). In response, the systems administrator can select any or all of the stale rules to be deleted. If the systems administrator does not select any of the stale rules to delete (decision 252, no branch), then program 47 reports that no such rules have been deleted (step 253). However, if the systems administrator selects for deletion any or all of the stale rules that are displayed (decision 252, yes branch), then program 47 will send a command to firewall 20 to delete the selected stale rule (step 254), and firewall 20 will do so. Alternately, for each and every stale rule listed in file 23, program 47 will automatically send a command to firewall 20 to delete the stale rule (step 256) without prior selection/confirmation by a systems administrator and firewall 20 will comply with the request to delete the stale rule.

Firewall management program 47 also generates rules of permitted message flows for a server which is newly added to a preexisting cluster of servers. In this example, there is a preexisting cluster 77 of servers 70, 80 and 90 that all include at least one common application 72 to provide a common service. A network dispatcher 75 interfaces between servers 70, 80 and 90 and Internet 24, and forwards requests from client computers 12$a$, $b$ . . . $n$ to servers 70, 80 and 90 according to a known load balancing algorithm. The servers 70, 80 and 90 in the cluster increase the processing/request-handling power for this common application, and provide redundancy and backup in case one of the servers 70, 80 and 90 goes down. In this example, server 70 also includes an application 69 which does not reside in servers 80 or 90, and server 80 includes an application 67 that does not reside in servers 70 or 90. Because server 70 includes application 69, and application 69 requires message flow types that are not needed for servers 80 or 90, firewall 20 includes rules for message flows to and from application 69 in server 70 that do not correspond to any message flows in servers 80 or 90. Because server 80 includes application 67, and application 67 requires message flow types that are not needed for servers 70 or 90, firewall 20 includes rules for message flows to and from application 67 in server 80 that do not correspond to any message flows in servers 70 or 90. When a systems administrator adds server 30 to the preexisting cluster 77 of servers 70, 80 and 90, the systems administrator notifies firewall management server 40. In response, program 47 automatically determines some rules of permitted message flows to and from server 30 as follows, which rules can then be added to firewall 20. Program 47 determines such rules for server 30 as follows. Program 47 determines from list 22 which rules of permitted message flows are "common" to all of the servers 70, 80 and 90 in the preexisting cluster except for the designation of server 70, 80 or 90, i.e. the message flow rule for each of the servers 70, 80 and 90 is identical to the other servers in the cluster except for the IP address of the respective server 70, 80 or 90. For example, assume there is a permitted message from the IP address of client computer 12$a$ to port X of the IP address of server 70, a permitted message from the IP address of client computer 12$a$ to port X of the IP address of server 80, and a permitted message from the IP address of client computer 12$a$ to port X of the IP address of server 90. In such a case, there is a common message flow rule for each of the servers 70, 80 and 90 except for the designation of server 70, 80 or 90. Consequently, program 47 automatically generates and displays a corresponding message flow rule for the newly added server 30, substituting the IP address of server 30 for the IP address of server 70, 80 or 90. Then, a systems administrator can determine whether this common rule should be installed in firewall 20, and direct firewall 20 accordingly. Alternately, program 47 can automatically install this common rule for the newly added server 30 in list 22 without confirmation by the systems administrator. Regardless of whether server 30 includes application 69 or application 67, program 47 will not identify as a "common" rule in the cluster, the rule for message flow to or from application 69 in server 70 or the rule for message flow to or from application 67 in server 80 because these message flow rules are not common for all preexisting servers 70, 80 and 90 in the cluster.

Figure 4A:
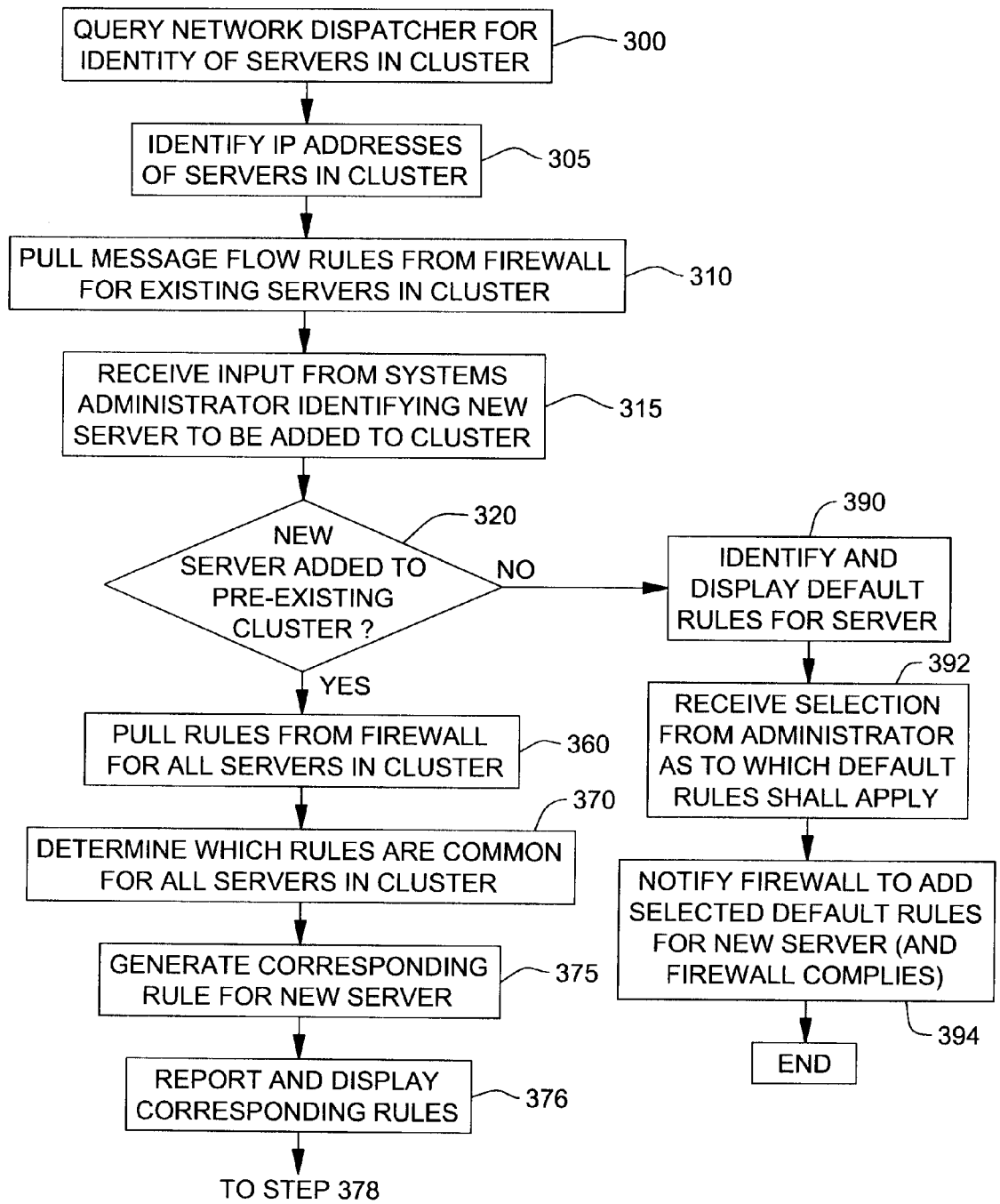
FIGS. 4(A) and 4(B) form a flow chart of another function of the firewall management program of FIG. 1 which automatically identifies new rules to be added to the firewall of FIG. 1 upon addition of a new server to an existing cluster of servers.
Figure 4B:
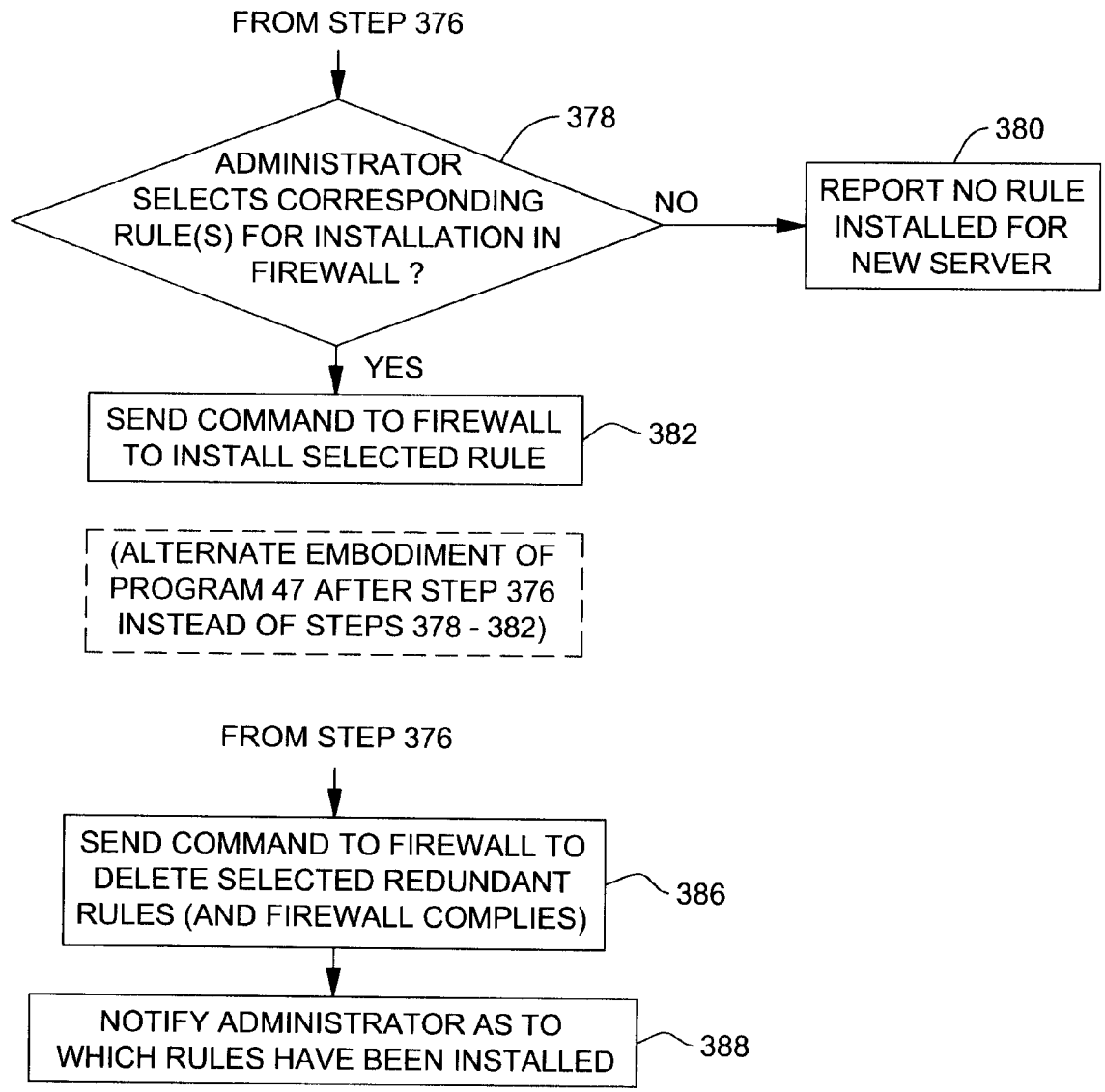

FIG. 4 illustrates the foregoing function of program 47 in more detail. In step 300, program 47 queries a cluster configuration file 78 in network dispatcher 75 to identify the current servers 70, 80 and 90 in the cluster. In response to the identification of the servers in the cluster, program 47 identifies the respective IP addressees of servers 70, 80 and 90 (step 305). In step 310 (which program 47 may perform after step 305 or in parallel with steps 300 and 305), program 47 queries firewall 20 for the list 22 of rules of permitted message flows. (The foregoing steps 300, 305 and 310 can be performed periodically or in response to step 315.) In step 315, a systems administrator indicates that server 30 should be included in cluster 77 by entering the IP address of server 30 and identifying cluster 77. In response, program 47 determines if server 30 is being added to an existing cluster (decision 320). In the illustrated example, server 30 is being added to existing cluster 77 (decision 320, yes branch). Next, program 47 determines which rules are common for all of servers 70, 80 and 90, except for the designation of IP address for server 70, 80 and 90 (step 370). For each such rule, program 47 automatically defines an identical/corresponding rule for server 30 except that the corresponding rule for server 30 specifies the IP address for server 30 instead of the IP address for server 70, 80 or 90 (step 375). Next, program 47 displays each corresponding rule for server 30 as proposed for inclusion in list 22 along with a notation that corresponding rules exist in list 22 for the other servers in the cluster 77 (step 376). An administrator then reviews each proposed rule for accuracy and compliance with applicable security policies, and selects whether each proposed, corresponding rule for server 30 should be installed in list 22 (decision 378). If not, then program 47 reports that no default rules will be installed for the new server (step 380). However, in response to the selections by the administrator to adopt any proposed rule for server 30, program 47 sends to firewall 20 the selected, corresponding rules for server 30 with a command to install them in list 22 (step 382), and firewall 20 complies by automatically entering these corresponding rules for server 30 into list 22.

In an alternate embodiment of the present invention, after identification of each common rule in servers 70, 80 and 90 in step 370 and generation of the corresponding rule for server 30 in step 375, program 47 automatically sends to firewall 20 each corresponding rule for server 30 with a command to install them in list 22 (step 386), and firewall 20 complies by automatically entering these corresponding rules for server 30 into list 22. Also, program 47 displays the corresponding rules and a notification to the systems administrator of what rules have been automatically installed for server 30 (step 388).

Refer again to decision 320, no branch, where the systems administrator indicates that server 30 will not be added to an existing cluster or designated server 30 to start a new cluster. In such a case, program 47 displays a set of default rules 29 for a server in a new cluster (step 390). An administrator previously defined the default rules. An administrator then reviews each default rule for accuracy and compliance with applicable security policies, and selects whether each default rule for server 30 should be installed in list 22 (step 392). In response to the selections by the administrator to adopt each default rule for server 30, program 47 sends to firewall 20 the selected, default rule for server 30 with a command to install them in list 22 (step 394), and firewall 20 complies by automatically entering these default rules for server 30 into list 22.

Program 47 can be loaded into server 40 from a computer readable media such as magnetic disk or tape, optical media, DVD, semiconductor memory, memory stick, etc. or downloaded from the Internet via TCP/IP adapter 41.

Based on the foregoing, a computer system, method and program product for managing a firewall have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed:

1. A computer program product for managing a firewall for a first server having a copy of a first application and a copy of a second application, the first server added to a server cluster comprising second and third servers, the second server having a copy of the first application and a copy of the second application, and the third server having a copy of the first application but not a copy of the second application, the computer program product comprising:
   one or more computer-readable tangible storage devices and program instructions stored on at least one of the one or more storage devices, the program instructions comprising:
   first program instructions to (a) identify first rules of permitted message flows through the firewall to the second and third servers for respective copies of the first application installed in the second and third servers, and (b) identify a second rule of permitted message flow through the firewall to the second server for the second application installed in the second server; and
   second program instructions, responsive to (a) the identification by the first program instructions of the first rules for both the second and third servers, to automatically generate a new rule for the firewall for a permitted message flow from a source IP address to a destination IP address of the first server, and (b) the identification by the first program instructions of the second rule for messages to the second application in the second server and the absence of a corresponding rule for messages to the third server for the second application indicating that the second application is not installed in the third server, to determine not to automatically generate another rule for the firewall for messages to the second application installed in the first server.

2. The computer program product of claim 1 further comprising third program instructions, stored on at least one of the one or more storage devices, to automatically install the new rule in the firewall.

3. The computer program product of claim 1 wherein:
   the first, second and new rules specify permitted messages flows through the firewall from IP addresses of source computers to IP addresses of the first, second and third servers.

4. A computer system for managing a firewall for a first server having a copy of a first application and a copy of a second application, the first server added to a server cluster comprising second and third servers, the second server having a copy of the first application and a copy of the second application, and the third server having a copy of the first application but not a copy of the second application, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

first program instructions to (a) identify first rules of permitted message flows through the firewall to the second and third servers for respective copies of the first application installed in the second and third servers, and (b) identify a second rule of permitted message flow through the firewall to the second server for the second application installed in the second server; and second program instructions, responsive to (a) the identification by the first program instructions of the first rules for both the second and third servers, to automatically generate a new rule for the firewall for a permitted message flow from a source IP address to a destination IP address of the first server, and (b) the identification by the first program instructions of the second rule for messages to the second application in the second server and the absence of a corresponding rule for messages to the third server for the second application indicating that the second application is not installed in the third server, to determine not to automatically generate another rule for the firewall for messages to the second application installed in the first server.

5. The computer system of claim 4 further comprising third program instructions, stored on at least one of the one or more storage devices for execution by at least one of the one or more processors via at least one of the one or more memories, to automatically install the new rule in the firewall.

6. The computer system of claim 4 wherein:
the first, second and new rules specify permitted messages flows through the firewall from IP addresses of source computers to IP addresses of the first, second and third servers.

* * * * *